US012589618B2

(12) United States Patent
Kremer

(10) Patent No.: US 12,589,618 B2
(45) Date of Patent: Mar. 31, 2026

(54) METHOD AND SYSTEM FOR MONITORING TIRE INFLATION PRESSURE

(71) Applicant: The Goodyear Tire & Rubber Company, Akron, OH (US)

(72) Inventor: Rainer Kremer, Eisenach (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 290 days.

(21) Appl. No.: 18/497,558

(22) Filed: Oct. 30, 2023

(65) Prior Publication Data

US 2024/0157737 A1 May 16, 2024

Related U.S. Application Data

(60) Provisional application No. 63/383,319, filed on Nov. 11, 2022.

(51) Int. Cl.
B60C 23/04 (2006.01)
B60C 23/06 (2006.01)

(52) U.S. Cl.
CPC ........ B60C 23/0474 (2013.01); B60C 23/064 (2013.01)

(58) Field of Classification Search
CPC ........................... B60C 23/0474; B60C 23/064
USPC .......................................................... 340/443
See application file for complete search history.

(56) References Cited

U.S. PATENT DOCUMENTS 4,364,267 A 12/1982 Love et al.
5,749,984 A * 5/1998 Frey ..................... B60C 11/243
73/488

| | | |
|---|---|---|
| 5,864,056 A | 1/1999 | Bell et al. |
| 6,083,268 A | 7/2000 | Kelsey et al. |
| 6,430,993 B1 | 8/2002 | Seta |
| 6,532,812 B2 | 3/2003 | King |
| 6,591,668 B1 | 7/2003 | Becherer et al. |
| 6,868,358 B2 | 3/2005 | Brown |
| 6,883,962 B2 | 4/2005 | Kurata |
| 7,158,018 B2 | 1/2007 | Schick |
| 7,299,694 B2 | 11/2007 | Byrne |
| 7,404,318 B2 | 7/2008 | Merino-Lopez et al. |
| 7,523,656 B1 | 4/2009 | Blixhavn et al. |
| 7,543,491 B2 | 6/2009 | Hammerschmidt et al. |
| 7,568,384 B2 | 8/2009 | Morinaga |

(Continued)

FOREIGN PATENT DOCUMENTS

| | | |
|---|---|---|
| CN | 101183402 A | 5/2008 |
| CN | 106248401 A | 12/2016 |

(Continued)

OTHER PUBLICATIONS

European Search Report for EP23208913 dated Mar. 11, 2024.

(Continued)

*Primary Examiner* — Kerri L Mcnally

(74) *Attorney, Agent, or Firm* — Edward T. Kennedy

(57) ABSTRACT

The invention provides a tire inflation pressure method and system. A tire inflation pressure adjustment signal is generated in order to maintain the centerline length of the tire's footprint within a range that allows the good performance of the tire. In embodiments of the invention, a linear relationship between tire inflation pressure, footprint centerline length and vehicle load are exploited to allow for an efficient implementation.

18 Claims, 3 Drawing Sheets

(56) References Cited

U.S. PATENT DOCUMENTS

| | | | |
|---|---|---|---|
| 7,577,532 | B2 | 8/2009 | Ichikawa et al. |
| 7,673,505 | B2 | 3/2010 | Hammerschmidt |
| 7,680,610 | B2 | 3/2010 | Miyashita et al. |
| 7,755,367 | B2 | 7/2010 | Schoen et al. |
| 8,049,515 | B2 | 11/2011 | Schoen et al. |
| 8,065,911 | B2 | 11/2011 | Taylor et al. |
| 8,096,172 | B2 | 1/2012 | Gotschlich |
| 8,371,159 | B2 | 2/2013 | Morinaga |
| 8,402,821 | B2 | 3/2013 | Fink et al. |
| 8,443,660 | B2 | 5/2013 | Grande et al. |
| 8,483,976 | B2 | 7/2013 | Morinaga |
| 8,555,698 | B2 | 10/2013 | Neugebauer et al. |
| 8,558,680 | B2 | 10/2013 | Pannek |
| 8,775,017 | B2 | 7/2014 | Brusarosco et al. |
| 8,794,058 | B2 | 8/2014 | Bigot et al. |
| 8,833,151 | B2 | 9/2014 | Tebano et al. |
| 8,833,410 | B2 | 9/2014 | Paturle |
| 8,849,500 | B2 | 9/2014 | Gokyu et al. |
| 8,881,573 | B2 | 11/2014 | Paturle et al. |
| 8,892,298 | B2 | 11/2014 | Paturle et al. |
| 8,904,869 | B2 | 12/2014 | Paturle |
| 9,052,257 | B2 | 6/2015 | Shibata |
| 9,120,356 | B2 | 9/2015 | Patel et al. |
| 9,423,320 | B2 | 8/2016 | Kuramoto et al. |
| 9,513,192 | B2 | 12/2016 | Kretschmann et al. |
| 9,669,664 | B2 | 6/2017 | Kretschmann |
| 9,873,293 | B2 | 1/2018 | Singh et al. |
| 9,908,374 | B2 | 3/2018 | Dussinger et al. |
| 9,921,134 | B2 | 3/2018 | Unterreiner et al. |
| 9,962,999 | B2 | 5/2018 | Roty |
| 9,963,146 | B2 | 5/2018 | Singh et al. |
| 9,994,082 | B2 | 6/2018 | Seboe et al. |
| 10,000,100 | B2 | 6/2018 | Weston |
| 10,005,328 | B2 | 6/2018 | Makino et al. |
| 10,024,765 | B2 | 7/2018 | Neau |
| 10,082,381 | B2 | 9/2018 | McMillen |
| 10,112,444 | B2 | 10/2018 | Takahashi et al. |
| 10,132,719 | B2 | 11/2018 | Fudulea |
| 10,207,551 | B2 | 2/2019 | Benbouhout et al. |
| 10,222,299 | B2 | 3/2019 | Ledoux |
| 10,245,906 | B2 | 4/2019 | Singh et al. |
| 10,252,583 | B2 | 4/2019 | Kandler et al. |
| 10,259,274 | B2 | 4/2019 | Lange et al. |
| 10,286,734 | B2 | 5/2019 | Masago |
| 10,286,735 | B2 | 5/2019 | Guinart et al. |
| 10,328,755 | B2 | 6/2019 | Tebano et al. |
| 10,350,949 | B2 | 7/2019 | Surendra |
| 10,399,396 | B2 | 9/2019 | Limbrunner et al. |
| 10,471,779 | B2 | 11/2019 | Masago |
| 10,495,457 | B2 | 12/2019 | Cyllik et al. |
| 10,513,156 | B2 | 12/2019 | Hrabal |
| 10,603,962 | B2 | 3/2020 | Singh |
| 11,644,386 | B2 | 5/2023 | Singh |
| 11,774,301 | B2 | 10/2023 | Decoster |
| 2004/0049303 | A1 | 3/2004 | Levy et al. |
| 2006/0114107 | A1 | 6/2006 | Kim et al. |
| 2012/0273102 | A1 | 11/2012 | Paturle |
| 2014/0069181 | A1 | 3/2014 | Singh et al. |
| 2014/0288859 | A1 | 9/2014 | Wittmann |
| 2015/0040656 | A1 | 2/2015 | Singh et al. |
| 2015/0247780 | A1 | 9/2015 | Kretschmann et al. |
| 2016/0167464 | A1 | 6/2016 | Freytag |
| 2016/0318356 | A1* | 11/2016 | McMillen .............. B60T 8/1725 |
| 2017/0113494 | A1 | 4/2017 | Singh et al. |
| 2017/0113495 | A1 | 4/2017 | Singh |
| 2017/0124784 | A1 | 5/2017 | Wittman et al. |
| 2017/0129498 | A1 | 5/2017 | Singh et al. |
| 2017/0320494 | A1 | 11/2017 | Singh et al. |
| 2018/0066929 | A1 | 3/2018 | Kandler et al. |
| 2018/0154707 | A1 | 6/2018 | Singh |
| 2018/0180463 | A1 | 6/2018 | Cyllik et al. |
| 2018/0253109 | A1 | 9/2018 | Fontaine et al. |
| 2019/0025113 | A1 | 1/2019 | Masago |
| 2019/0184763 | A1 | 6/2019 | Pulford et al. |
| 2019/0193479 | A1 | 6/2019 | Pulford et al. |
| 2019/0304084 | A1 | 10/2019 | Oblizajek |
| 2019/0382034 | A1 | 12/2019 | Miller et al. |
| 2020/0001662 | A1 | 1/2020 | Storti et al. |
| 2020/0023693 | A1 | 1/2020 | Ochi et al. |
| 2020/0031183 | A1 | 1/2020 | Kim |
| 2020/0047571 | A1 | 2/2020 | Oblizajek |
| 2020/0062268 | A1 | 2/2020 | Steiner |
| 2020/0070589 | A1 | 3/2020 | Kuerzl et al. |
| 2020/0094634 | A1 | 3/2020 | Decoster et al. |
| 2020/0126323 | A1 | 4/2020 | Ledoux et al. |
| 2021/0008933 | A1 | 1/2021 | Kretschmann et al. |
| 2021/0061020 | A1 | 3/2021 | Singh et al. |
| 2021/0061022 | A1 | 3/2021 | Singh et al. |
| 2022/0388348 | A1 | 12/2022 | Singh et al. |
| 2023/0060281 | A1 | 3/2023 | Singh et al. |

FOREIGN PATENT DOCUMENTS

| | | |
|---|---|---|
| CN | 109472885 A | 3/2019 |
| DE | 102013208553 A1 | 11/2014 |
| DE | 102013220882 A1 | 4/2015 |
| DE | 102014214626 A1 | 1/2016 |
| DE | 102017221142 A1 | 5/2019 |
| EP | 3318422 A1 | 5/2018 |
| JP | 2013169816 A | 9/2013 |
| JP | 2016137847 A | 8/2016 |
| WO | 2015055429 A1 | 4/2015 |
| WO | 2019186353 A1 | 10/2019 |
| WO | 2019239305 A3 | 2/2020 |
| WO | 2020070051 A1 | 4/2020 |

OTHER PUBLICATIONS

Zhou Haibin, Prediction of wear life of engineering tires, Prediction of wear life of engineering tires, 6, 36-40, 46, Jun. 30, 2004, World Rubber Industry.

Zhu Chunxia, et al., Computer simulation of radial tire wear, Computer simulation of radial tire wear, 2, 57-58, Feb. 1, 2008, Research on Agricultural Mechanization.

* cited by examiner

METHOD AND SYSTEM FOR MONITORING TIRE INFLATION PRESSURE

FIELD OF THE INVENTION

The invention relates generally to tire monitoring systems. More particularly, the invention relates to systems that monitor tire inflation pressure. Specifically, the invention is directed to a system and method for estimating a tire inflation pressure adjustment based on the length of the footprint of the tire.

BACKGROUND OF THE INVENTION

Tire inflation pressure plays an important role in vehicle factors such as safety, reliability and performance. Tread wear, which refers to the loss of material from the tread of the tire, directly affects such vehicle factors, and tire inflation pressure directly relates to tread wear. Inaccurate tire inflation pressure can cause the loss of energy through increased friction while driving a vehicle. It may further lead to increased fuel consumption, tire noise, reduced traction and worsened handling due to uneven tire tread wear.

In known systems, tire inflation pressure is measured as an absolute value by a dedicated pressure sensor that is installed in the tire. If the measured inflation pressure substantially deviates from a predetermined range of values, a control system of the vehicle may raise an alert and indicate that inflation pressure should be adjusted. However, such systems are oblivious of the tire's actual performance at the current inflation pressure, which may further depend on external factors such as the wear of the tire, the load of the vehicle or others. Therefore, the accuracy of known tire inflation pressure monitoring systems is relatively low.

As a result, there is a need in the art for a method and system that reliably estimates a required tire inflation pressure adjustment, so that the tire may perform well independently of other factors.

SUMMARY OF THE INVENTION

The invention relates to a method in accordance with claim 1 and to a system in accordance with claim 10.

Dependent claims refer to preferred embodiments of the invention.

According to an aspect of the invention, a computer implemented method for monitoring an inflation pressure of a tire supporting a vehicle is provided. The method comprises: providing data in a memory element, wherein the data associates at least one centerline length of a footprint of a tire with a corresponding predetermined tire inflation pressure;

obtaining a centerline length signal that is indicative of a centerline length of the footprint of the tire;

generating a tire inflation pressure adjustment signal indicating a required adjustment of the tire inflation pressure, based on the centerline length signal and on said data.

Preferably, the step of generating a tire inflation pressure adjustment signal may comprise generating a difference between the centerline length indicated by the centerline length signal and a target centerline length stored in said data, and providing the tire inflation pressure adjustment signal if the difference exceeds a predetermined threshold value.

The tire inflation pressure adjustment signal may preferably comprise an indication of a predetermined target tire inflation pressure, which is associated with said target centerline length in said data.

Preferably, the tire inflation pressure adjustment signal may comprise an indication of a difference between a predetermined tire inflation pressure associated in said data with the centerline length indicated by the centerline length signal, and a predetermined target tire inflation pressure associated in said data with said target centerline length.

The tire inflation pressure adjustment signal may preferably comprise an indication of a difference between a measured tire inflation pressure and a predetermined target tire inflation pressure associated in said data with said target centerline length.

For each centerline length of a footprint of the tire, a plurality of predetermined tire inflation pressures may preferably be provided in said data. Preferably, each tire inflation pressure may correspond to a predetermined vehicle load, generating a tire inflation pressure adjustment signal may comprise evaluating a load of the vehicle.

Preferably, said data may associate at least one centerline length of a footprint of a tire with a corresponding predetermined tire inflation pressure using a linear relationship that is defined by a set of linear parameters.

The data may preferably comprise the linear parameters, and generating a tire inflation pressure adjustment signal may preferably comprise determining a predetermined target tire inflation pressure by evaluating the linear relationship using a target centerline length and the set of linear parameters.

The centerline length signal may preferably provide a shape of the footprint of the tire.

According to another aspect of the invention, a computer program comprising computer readable code means is provided, which, when run on a computer, causes the computer to carry out the method according to an aspect of the invention.

According to a further aspect of the invention, a computer program product is provided, which comprises a computer-readable medium on which the computer program according to an aspect of the invention is stored.

According to a further aspect of the invention, a tire inflation pressure monitoring system comprising a vehicle, a tire supporting the vehicle a first sensor unit, a memory element and a processor is provided.

The first sensor unit is mounted on the tire and includes a footprint centerline length measurement sensor to measure a centerline length of a footprint of the tire. The memory element stores data that associates at least one centerline length of the footprint of the tire with a corresponding predetermined tire inflation pressure The processor is in electronic communication with the first sensor unit. The system is remarkable in that the processor is configured to obtain a centerline length signal from the sensor unit, the signal being indicative of a centerline length of the footprint of the tire, and to generate a tire inflation pressure adjustment signal indicating a required adjustment of the tire inflation pressure, based on the centerline length signal and on said data.

Preferably, the first sensor unit may be attached to an innerliner of the tire at an equatorial centerplane of the tire.

The first sensor unit may preferably include a transmitter having an antenna for wireless data transmission to said processor.

Preferably, the processor may include a transmitter to transmit the inflation pressure adjustment signal to at least one of a display device or to a vehicle control system.

Generating the tire inflation pressure adjustment signal may preferably comprise generating a difference between the centerline length indicated by the centerline length signal and a target centerline length stored in said data. The processor may further preferably be configured to provide the tire inflation pressure adjustment signal if the difference exceeds a predetermined threshold value.

Further, the processor may preferably be configured to provide an indication of a predetermined target tire inflation pressure, which is associated with said target centerline length in said data.

The processor may preferably be configured to provide an indication of a difference between a predetermined tire inflation pressure associated in said data with the centerline length indicated by the centerline length signal, and a predetermined target tire inflation pressure associated in said data with said target centerline length.

Preferably, the processor may be configured to provide an indication of a difference between a measured tire inflation pressure and a predetermined target tire inflation pressure associated in said data with said target centerline length.

The tire inflation pressure monitoring system may preferably comprise a second sensor unit comprising a vehicle load sensor, wherein the processor is in electronic communication with the second sensor unit, and wherein the processor is configured to obtain a load estimate from the second sensor unit.

In said data, each centerline length of a footprint of the tire may preferably be associated with a plurality of predetermined tire inflation pressures, each tire inflation pressure corresponding to a predetermined vehicle load. The processor may preferably be configured to generate the tire inflation pressure adjustment signal in dependence of the load estimate.

The data may preferably comprise a linear regression model associating predetermined centerline lengths of the footprint of the tire with corresponding predetermined tire inflation pressures.

It has been observed that the shape and size of the footprint of a tire, which is the area of the tire that contacts the road, directly impacts the tire's performance in terms of tread wear. While it has been suggested to characterize a footprint through multiple measurements, the present invention relies on the observation that changes in a centerline length of the footprint correlate well with the overall footprint shape changes, so that monitoring a single measure provides useful data for monitoring the performance of a tire. Further, it has been observed that there exists a linear relationship between the centerline length of a tire's footprint and the tire's inflation pressure. The invention uses these observations to indirectly monitor the tire's inflation pressure by monitoring the tire's footprint centerline length, which itself is the result of the load on the vehicle, and the tire's prior wear. A tire inflation pressure adjustment is quantified using the linear relationship to the tire's footprint centerline length, which results in a lightweight, yet efficient tire inflation pressure monitoring solution. Rather than aiming for a target nominal inflation pressure, it is the aim of the invention to achieve a tire footprint that causes the tire to perform well. Tire inflation pressure is used to act on the footprint's centerline length, and thereby on its shape.

Definitions

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

BRIEF DESCRIPTION OF THE DRAWINGS

The invention will be described by way of example and with reference to the accompanying drawings in which.

DETAILED DESCRIPTION OF THE INVENTION

With reference of FIG. 1 through 6, an exemplary embodiment of the tire inflation pressure monitoring system of the present invention is indicated at 10. The tire inflation pressure monitoring system 10 and accompanying method attempts to overcome challenges posed by prior art methods. Instead of aiming to maintain a nominal inflation pressure, the proposed tire inflation pressure monitoring system aims at maintaining a footprint centerline length that enables the tire to perform well. If the footprint centerline length deviates from a predetermined target centerline length, at which the tire is known to provide its best performance, an inflation pressure adjustment is signaled, which aims at restoring a centerline length which is close to the target centerline length.

The centerline length of a tire should be monitored throughout the life of the tire and compared against the target centerline length. The aim is that the footprint centerline length remains within tolerances. Under these circumstances, the tire will most probably wear evenly with regards to centerline and shoulder wear. However, if the centerline length of the tire exceeds the maximum limit of the centerline length, footprint shape becomes more round or oval and this would indicate a faster shoulder wear. While centerline length falls below the minimum range, the footprint shape becomes more squared or butterflied, which is a potential indicator for faster centerline wear.

Figure 1:
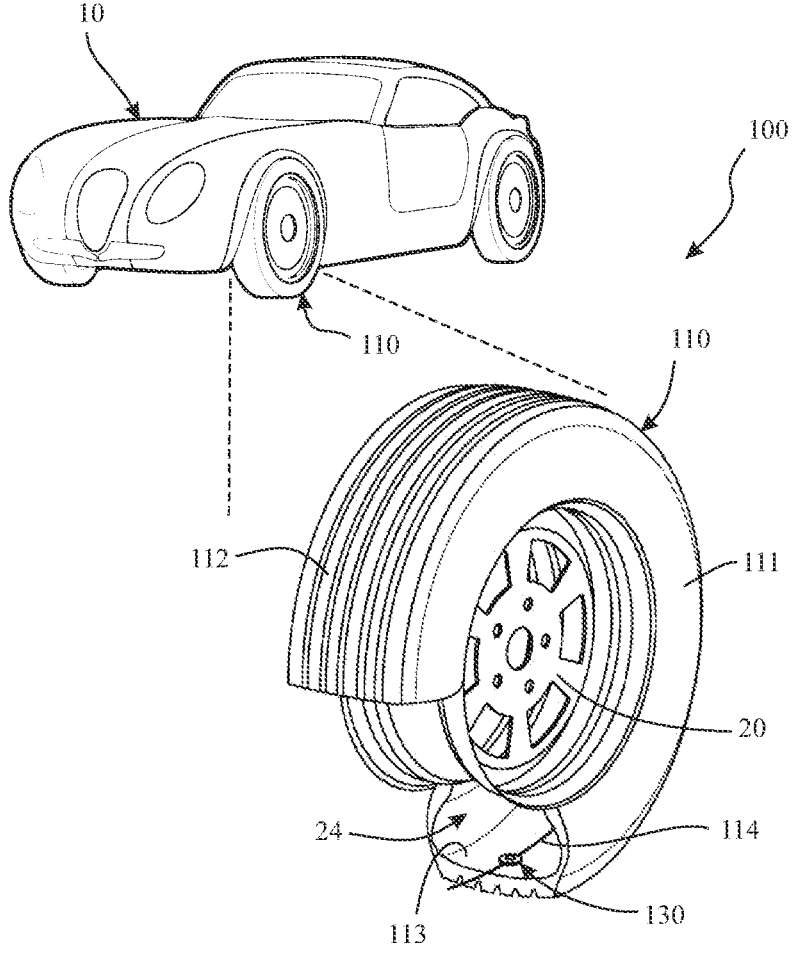
FIG. 1 is a schematic perspective view of a vehicle that includes a tire employing an embodiment of the tire inflation pressure monitoring system in accordance with the present invention.

With reference to FIG. 1, the system 100 estimates a tire inflation adjustment on each tire 110 supporting a vehicle 10. While the vehicle 10 is depicted as a passenger car, the invention is not to be so restricted. The principles of the invention find application in other vehicle categories, such as commercial trucks, in which vehicles may be supported by more or fewer tires than those shown in FIG. 1.

The tires 110 are of conventional constructions, and each tire is mounted on a respective wheel 20 as known to those skilled in the art. Each tire 110 includes a pair of sidewalls 11, of which only one is shown, that extend to a circumferential tread 112, which wears with age from road abrasion. An innerliner 113 is disposed on the inner surface of the tire 110, and when the tire is mounted on the wheel 20, an internal cavity 24 is formed, which is filled with a pressurized fluid, such as air.

A first sensor unit 130 is attached to the innerliner 113 of each tire 110 by means such as an adhesive and measures parameters indicative of a centerline length of the tire's footprint, as will be described in greater detail below. Preferably, the first sensor unit 130 is attached to the innerliner 113 at an equatorial centerplane 114 of the tire 110.

The first sensor unit 130 optionally also includes electronic memory capacity for storing identification information for each tire 110. Alternatively, such information may be included in another sensor unit, or in a separate storage medium, such as a tire identification tag, which is in electronic communication with the first sensor unit 130. The tire identification information may include tire parameter and/or manufacturing information.

Figure 2:
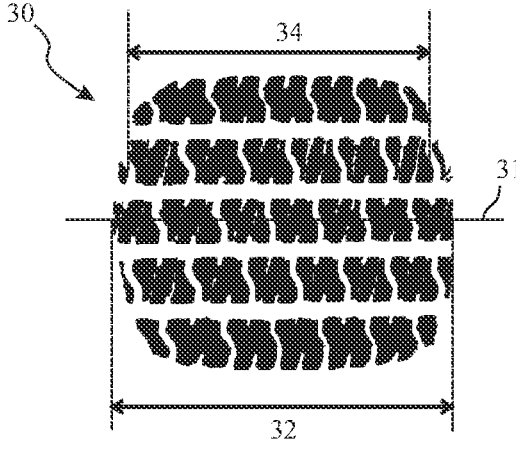
FIG. 2 is a plan view of a footprint of a tire.
Figure 3:
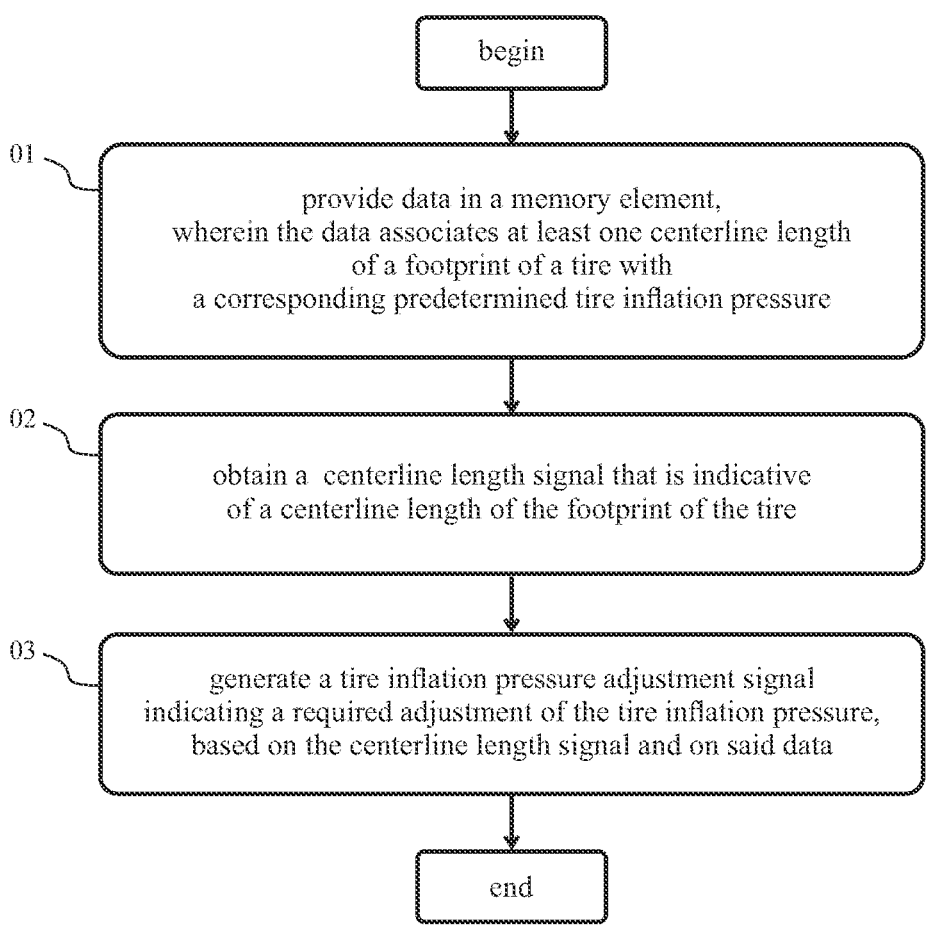
FIG. 3 is a workflow illustrating the main steps of an embodiment of the method in accordance with the present invention.
Figure 4:
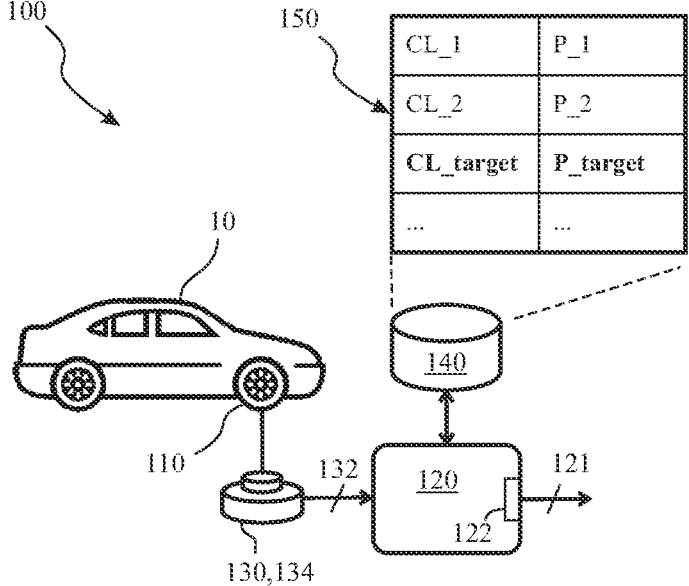
FIG. 4 is a schematic diagram showing aspects of an embodiment of the tire inflation pressure monitoring system in accordance with the present invention.

Turning to FIG. 2, the first sensor unit 130 (FIG. 1) preferably measure a length 32 of a centerline 31 of a footprint 30 of the tire 110. As the tire 110 contacts the ground, the area of contact created by the tread 11 with the ground is known as the footprint 30. It has been proposed to characterize the shape of the footprint through measurements of different lengths such as a shoulder length 34 along an inboard and/or outboard side of the footprint, and a centerline 31 of the footprint 30. However, it has been observed that such factors for characterizing the overall shape using multiple measurements show a high level of correlation with the centerline length 32 of the footprint 30. The centerline 31 of the footprint 30 corresponds to the equatorial centerplane of the tire 110, which is the plane that is perpendicular to the axis of rotation of the tire and which passes through the center of the tread 112. The first sensor unit 130 thus measure the length 32 of the centerline 31 of the footprint 30, which is referred to herein as the footprint centerline length 32. Any suitable technique for measuring the footprint centerline length 32 may be employed by the first sensor unit 130. For example, the first sensor unit 130 may include a strain sensor or a piezoelectric sensor that measures deformation of the tread 112 and thus indicates the centerline length 32.

An embodiment of the method and system in accordance with the invention is now described with reference to FIGS.

3 and 4. The tire inflation pressure monitoring system 100 comprises an electronic memory capacity 140 in which a data set 150 is stored. The data 150 associates at least one centerline length of the footprint of a tire 110 with a corresponding predetermined tire inflation pressure. While the data 150 may comprise several such data pairs as indicated on FIG. 150, the minimal data set associates a target centerline length CL_target with a corresponding target inflation pressure P_target of the tire 110. The data 150 is pre-stored in the memory element and obtained for a given type of tire 110 through test measurements in realistic conditions. Optionally, the memory element 140 may be structured as a database which is capable of processing queries and producing corresponding result sets. In particular, the memory element 140 may store multiple sets of data 150 corresponding to multiple types of tires, which may be identified by tire identification data. Providing the data 150 in the memory element 140 corresponds to step 01 of method illustrated in FIG. 3.

The tire inflation pressure monitoring system 100 further comprises the vehicle shown in 10 that is supported by a set of tires 110. Each of the tires is equipped with a first sensor unit 130 that includes a footprint centerline length measurement sensor such as a strain sensor, to provide a signal 132 which is indicative of footprint centerline length 32 (FIG. 2) of the tire. The centerline length signal 132 is transmitted to a processor 120. Aspects of the proposed tire inflation pressure monitoring method are executed on the processor 120, which enables input of data from the first sensor unit 130, an which has at least read access to the memory element 140, and which enable execution of specific analysis and algorithms, which are stored in a suitable storage medium and are also in electronic communication with the processor. The first sensor unit 130 measure the centerline length and transmits it to the processor 150 using a wireless data transmitter 134. Obtaining the centerline length signal 132 at the processor 120 corresponds to step 02 of the method illustrated in FIG. 3.

It should be noted that in an embodiment wherein the memory element 140 stores multiple sets of data 150 corresponding to multiple types of tires, the data set of interest for the following step is identified by any suitable tire identification data, which may in this optional case also be transmitted together with the centerline length signal 132 from the tire's sensor unit 130 to the processor. The processor 120 uses the tire identification data to retrieve the corresponding data from the memory element 140.

Based on the provided input centerline length signal 132 that indicates an actual centerline length 32 of the tire 110, and using the data 150, the processor 120 generates a tire inflation pressure adjustment signal 121, which indicates a required adjustment of the tire inflation pressure. The output signal 121 is transmitted using a transmitter 122 to a control unit of the vehicle 10, which may for example generate an audible or visual alert for the driver. Typically, both the processor 120 and the memory element 140 may be provided within the vehicle 10, so that the processor is capable of communicating the signal 121 to a vehicle control unit through the vehicle's CAN bus or other suitable data transmission channels.

In one embodiment of the invention, the processor 120 is configured by corresponding software code instructions to generate a difference between the centerline length 32 indicated by the received centerline length signal 132 and a predetermined target centerline length, at which the tire 110 is known to provide good performance. If this difference exceeds a predetermined threshold value, for example 10, 20 or 50 mm, the tire inflation pressure adjustment signal 121 is generated.

Figure 5:
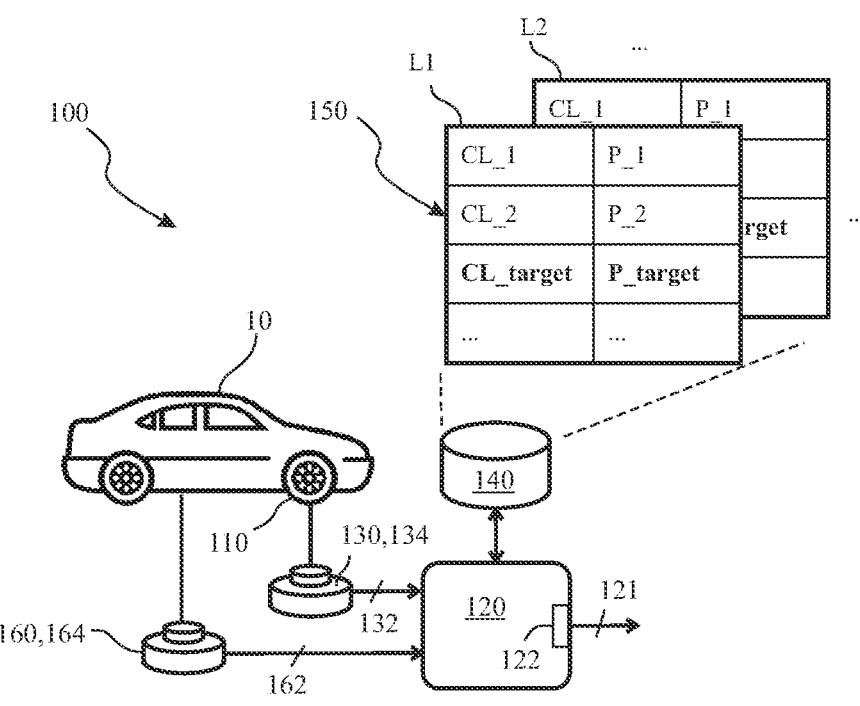
FIG. 5 is a schematic diagram showing aspects of an embodiment of the tire inflation pressure monitoring system in accordance with the present invention.

A further embodiment of the invention is illustrated in FIG. 5. The tire inflation pressure monitoring system 100 comprises an electronic memory capacity 140 in which a data set 150 is stored. The data 150 associates at least one centerline length of the footprint of a tire 110 with a corresponding predetermined tire inflation pressure. While the data 150 may comprise several such data pairs as indicated on FIG. 150, the minimal data set associates a target centerline length CL_target with a corresponding target inflation pressure P_target of the tire 110. The data 150 is pre-stored in the memory element and obtained for a given type of tire 110 through test measurements in realistic conditions.

Specifically, the data 150 comprises multiple associations between centerline lengths and corresponding tire inflation pressure values, wherein each association corresponds to a specific vehicle load L1, L2, . . . . The load supported by the tires 110 of the vehicle 10 impacts the centerline length 32 (FIG. 2) of the tire in that the latter increases with the former at equal tire inflation pressure.

Each of the tires is equipped with a first sensor unit 130 that includes a footprint centerline length measurement sensor such as a strain sensor, to provide a signal 132 which is indicative of footprint centerline length 32 (FIG. 2) of the tire. The centerline length signal 132 is transmitted to a processor 120 using transmitter 134.

Further, the vehicle is equipped with at least one load sensor 160 which is capable of transmitting, using transmitter 164, a signal 162 indicative of the vehicle's load to the processor 150. As the memory element 140 stores multiple sets of data 150 corresponding to multiple different vehicle loads, the data set of interest for the following step is identified by the received load signal 162.

Based on the provided input centerline length signal 132 that indicates an actual centerline length 32 of the tire 110, based on the load signal 162 and using the data 150, the processor 120 generates a tire inflation pressure adjustment signal 121, which indicates a required adjustment of the tire inflation pressure. All other aspects of the embodiment described in the context of FIG. 4 remain applicable.

Figure 6:
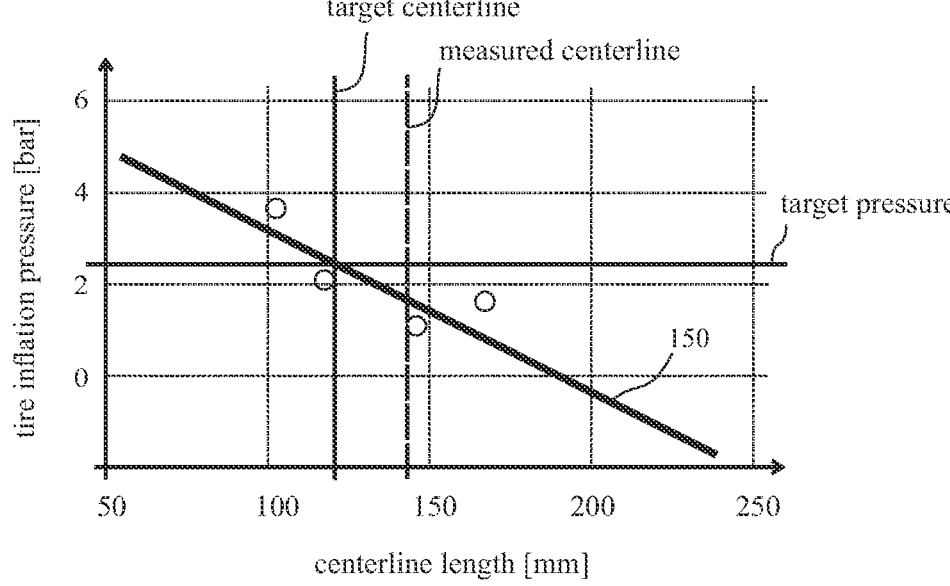
FIG. 6 is a graphical representation of data showing the linear relationship of the footprint centerline length of a tire to its inflation pressure.

Instead of storing discrete value pairs that associate centerline lengths 32 (CL_1, CL_2, . . . in FIGS. 4 and 5) with corresponding tire inflation pressure values, the data 150 may be stored by way of a model, as shown in FIG. 6. FIG. 6 illustrates a linear regression model which has been obtained through known mathematical methods. From measured centerline lengths and corresponding tire inflation pressure values, indicated by rounds in FIG. 6, a linear approximation of the relationship between the two parameters is provided. It has been observed that this linear approximation provides a good fit for the data. The model thus provides a linear relationship of the type P=a*CL+b, where a and b are matched coefficients, P is an inflation pressure in bar, CL is a centerline length in mm and * denotes multiplication. It is thus sufficient to store the coefficients a and b in the memory element 140, and to cause the processor 120 to evaluate the corresponding formula based on the received input signal 132.

While the model has been described as a linear regression model, other regression models may be employed without affecting the overall concept or operation of the invention. For example, footprint length as a function of inflation pressure may be linearized within a certain operating range to simplify the system. Because footprint length as a function of inflation pressure over a larger range may constitute a nonlinear relationship, the regression model may alternatively include a nonlinear regression model.

While not illustrated, it should be noted that a corresponding linear relationship has also been observed between tire inflation pressure and vehicle load. A corresponding model thus provides a linear relationship of the type P=a*CL+b*L+c, where a, b and c are matched coefficients, P is an inflation pressure in bar, CL is a centerline length in mm, L is a load in kg and * denotes multiplication.

In all embodiments, while the tire inflation pressure adjustment signal 121 may merely indicate a required increase or decrease of the pressure depending on the comparison between the measured centerline length 32 and the target centerline length, the tire inflation pressure adjustment signal 121 may alternatively carry further information. By way of a non-limiting example, the tire inflation pressure adjustment signal 121 may comprise the predetermined target tire inflation pressure P_target, at which the desired target centerline length CL_target should be obtained.

Alternatively, or additionally, the tire inflation pressure adjustment signal may comprise an indication of the difference between the predetermined tire inflation pressure associated in the data 150 with the centerline length 32 as indicated by the centerline length signal 132, and the predetermined target tire inflation pressure corresponding to the target centerline length. This may be better understood with reference to FIG. 6, assuming a known load of the vehicle. The target centerline length is a known predetermined value for a given tire. The data or linear regression model 150 associates the target centerline length straightforwardly with the target inflation pressure. Similarly, the measured centerline length is associated through the data or linear regression model 150 with a predetermined tire inflation pressure. This tire inflation pressure value is thus indirectly determined, without actual measurement of the current tire inflation pressure. The difference between this estimated current tire inflation pressure value and the target tire inflation pressure may then be provided in the output signal 121, thereby providing explicit guidance as to how the tire inflation pressure needs to be changed for improving tire performance. The signal 121 allows to notify an otherwise unavailable indication of the state of the tire to the vehicle's control unit or to the driver, thereby allowing to act upon this signal.

Alternatively, the first sensor 130 may include a pressure sensor providing a pressure measurement to the processor 120, so that the actual difference between the sensed tire inflation pressure and the target tire inflation pressure as provided through the data or linear regression model 150 may be included in the output signal.

If the adjusted tire inflation pressure should exceed a predetermined minimum or maximum inflation pressure value, beyond or above which the tire is not able to perform, the output signal 121 may include a warning signal indicating a required maintenance or change of tires.

It is to be understood that the structure and method of the above-described tire inflation pressure monitoring system may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications.

In addition, while the invention has been described in the context of measurement of the tire footprint centerline length, other measurements may be employed as alternatives without affecting the overall concept or operation of the invention. For example, measurement of footprint contact time, footprint contact angle, vertical tire deflection, and/or footprint contact area may be employed. Furthermore, while measurement of the tire footprint centerline length has been described above as correlating with footprint shape changes, the present invention also includes measurement of footprint length without a correlation to footprint shape changes.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A computer implemented method for monitoring an inflation pressure of a tire supporting a vehicle, comprising:
   providing data in a memory element, wherein the data associates at least one centerline length of a footprint of a tire with a corresponding predetermined tire inflation pressure;
   obtaining a centerline length signal that is indicative of a centerline length of the footprint of the tire; and
   generating a tire inflation pressure adjustment signal indicating a required adjustment of the tire inflation pressure, based on the centerline length signal and on said data, wherein generating the tire inflation pressure adjustment signal includes generating a difference between the centerline length indicated by the centerline length signal and a target centerline length stored in said data, and providing the tire inflation pressure adjustment signal if the difference exceeds a predetermined threshold value.

2. The computer implemented method of claim 1, wherein the tire inflation pressure adjustment signal comprises an indication of a predetermined target tire inflation pressure, which is associated with said target centerline length in said data.

3. The computer implemented method of claim 1, wherein the tire inflation pressure adjustment signal comprises an indication of a difference between a predetermined tire inflation pressure associated in said data with the centerline length indicated by the centerline length signal, and a predetermined target tire inflation pressure associated in said data with said target centerline length.

4. The computer implemented method of claim 1, wherein the tire inflation pressure adjustment signal comprises an indication of a difference between a measured tire inflation pressure and a predetermined target tire inflation pressure associated in said data with said target centerline length.

5. The computer implemented method of claim 1, wherein for each centerline length of a footprint of the tire, a plurality of predetermined tire inflation pressures is provided in said data, each tire inflation pressure corresponding to a predetermined vehicle load, and wherein generating a tire inflation pressure adjustment signal comprises evaluating a load of the vehicle.

6. The computer implemented method of claim 1, wherein said data associates at least one centerline length of a footprint of a tire with a corresponding predetermined tire inflation pressure using a linear relationship that is defined by a set of linear parameters.

7. The computer implemented method of claim 6, wherein said data comprises the linear parameters, and wherein generating a tire inflation pressure adjustment signal comprises determining a predetermined target tire inflation pressure by evaluating the linear relationship using a target centerline length and the set of linear parameters.

8. The computer implemented method of claim 1, wherein the centerline length signal provides a shape of the footprint of the tire.

9. A tire inflation pressure monitoring system comprising:
   a vehicle;
   a tire supporting the vehicle;
   a first sensor unit being mounted on the tire, the first sensor unit including a footprint centerline length measurement sensor to measure a centerline length of a footprint of the tire;
   a memory element for storing data that associates at least one centerline length of the footprint of the tire with a corresponding predetermined tire inflation pressure; and
   a processor in electronic communication with the first sensor unit and with the memory element, the processor being configured to:
      obtain a centerline length signal from the sensor unit, the signal being indicative of a centerline length of the footprint of the tire; and
      generate a tire inflation pressure adjustment signal indicating a required adjustment of the tire inflation pressure, based on the centerline length signal and on said data, wherein generating the tire inflation pressure adjustment signal comprises generating a difference between the centerline length indicated by the centerline length signal and a target centerline length stored in said data, and wherein the processor is further configured to provide the tire inflation pressure adjustment signal if the difference exceeds a predetermined threshold value.

10. The tire inflation pressure monitoring system of claim 9, wherein the first sensor unit is attached to an innerliner of the tire at an equatorial centerplane of the tire.

11. The tire inflation pressure monitoring system of claim 9, wherein the first sensor unit includes a transmitter including an antenna for wireless data transmission to said processor.

12. The tire inflation pressure monitoring system of claim 9, wherein the processor includes a transmitter to transmit the inflation pressure adjustment signal to at least one of a display device or to a vehicle control system.

13. The tire inflation pressure monitoring system of claim 9, wherein the processor is further configured to provide an indication of a predetermined target tire inflation pressure, which is associated with said target centerline length in said data.

14. The tire inflation pressure monitoring system of claim 9, wherein the processor is further configured to provide an indication of a difference between a predetermined tire inflation pressure associated in said data with the centerline length indicated by the centerline length signal, and a predetermined target tire inflation pressure associated in said data with said target centerline length.

15. The tire inflation pressure monitoring system of claim 9, wherein the processor is further configured to provide an indication of a difference between a measured tire inflation pressure and a predetermined target tire inflation pressure associated in said data with said target centerline length.

16. The tire inflation pressure monitoring system of claim 9, comprising a second sensor unit comprising a vehicle load sensor, wherein the processor is in electronic communication with the second sensor unit, and wherein the processor is configured to obtain a load estimate from the second sensor unit.

17. The tire inflation pressure monitoring system of claim 16, wherein in said data, each centerline length of a footprint of the tire is associated with a plurality of predetermined tire inflation pressures, each tire inflation pressure corresponding to a predetermined vehicle load, and wherein the processor is configured to generate the tire inflation pressure adjustment signal in dependence of the load estimate.

18. The tire inflation pressure monitoring system of claim 9, wherein said data comprises a linear regression model associating predetermined centerline lengths of the footprint of the tire with corresponding predetermined tire inflation pressures.

* * * * *